United States Patent [19]

Chamard et al.

[11] Patent Number: 5,679,237
[45] Date of Patent: Oct. 21, 1997

[54] ELECTROCHEMICAL SYNTHESIS OF TRANSITION METAL/PHOSPHINE CATALYST COMPOUNDS

[75] Inventors: Alex Chamard, Corbas; Dominique Horbez, Franconville; Marc Huser, Villeurbanne; Robert Perron, Charly, all of France

[73] Assignee: R. P. Fiber & Resin Intermediates, Courbevoie Cedex, France

[21] Appl. No.: 568,295

[22] Filed: Dec. 6, 1995

[30] Foreign Application Priority Data

Dec. 6, 1994 [FR] France .................................. 94-14884

[51] Int. Cl.[6] .......................... C25B 3/00; C25B 3/12
[52] U.S. Cl. ................... 205/420; 205/445; 205/455; 205/457; 205/458
[58] Field of Search ................. 205/420, 445, 205/455, 457, 458

[56] References Cited

FOREIGN PATENT DOCUMENTS

| | | |
|---|---|---|
| 288344 | 10/1988 | European Pat. Off. . |
| 0354845 | 2/1990 | European Pat. Off. . |
| 0602463 | 6/1994 | European Pat. Off. . |
| 2080556 | 11/1971 | France . |
| 2338253 | 8/1977 | France . |

*Primary Examiner*—Kathryn L. Gorgos
*Assistant Examiner*—Edna Wong
*Attorney, Agent, or Firm*—Burns, Doane, Swecker & Mathis, L.L.P.

[57] ABSTRACT

Catalyst compounds comprising at least one transition metal having an oxidation number of 0 or 1 and at least one sulfonated phosphine are electrochemically synthesized, by electrolyzing an aqueous solution catholyte (contained in the cathode compartment of any suitable electrolytic cell) comprising at least one transition metal compound and at least one sulfonated phosphine.

24 Claims, No Drawings

ELECTROCHEMICAL SYNTHESIS OF TRANSITION METAL/PHOSPHINE CATALYST COMPOUNDS

BACKGROUND OF THE INVENTION

1. Technical Field of the Invention

The present invention relates to the electrochemical preparation of catalyst compounds, and more especially, to the electrochemical synthesis of catalyst compounds comprising at least one transition metal having an oxidation number of 0 or 1, and at least one water-soluble sulfonated phosphine.

2. Description of the Prior Art

The subject compounds are useful catalysts, for example, in the ethylene-compound hydrocyanation reaction described in FR-A-2,338,253. In the instant application, they will simply be designated "catalysts," without intending, however, to in any way limit their field of use.

SUMMARY OF THE INVENTION

Briefly, the present invention features a process for the electrochemical synthesis of catalysts comprising at least one transition metal having an oxidation number of 0 or 1, combined with at least one sulfonated phosphine, which comprises electrolytically treating an aqueous solution containing at least one compound of a transition metal and at least one sulfonated phosphine, placed in the cathode compartment of an electrolysis cell of an electrolyzer.

DETAILED DESCRIPTION OF BEST MODE AND SPECIFIC/PREFERRED EMBODIMENTS OF THE INVENTION

More particularly according to the present invention, the at least one sulfonated phosphine employed in subject process advantageously has the following structural formula (I):

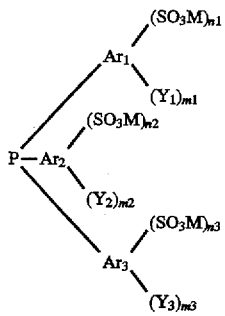

in which $Ar_1$, $Ar_2$ and $Ar_3$, which may be identical or different, are each an aryl radical; $Y_1$, $Y_2$ and $Y_3$, which may be identical or different, are each an alkyl radical having from 1 to 4 carbon atoms, an alkoxy radical having from 1 to 4 carbon atoms, a halogen atom, a CN radical, an $NO_2$ radical, an OH radical, an $NR_1R_2$ radical, wherein $R_1$ and $R_2$, which may be identical or different, are each an alkyl radical having from 1 to 4 carbon atoms; M is an inorganic or organic cation selected, such that the compound of formula (I) is soluble in water, from among $H^+$, an alkali metal or alkaline earth metal cation, a cation having the formula $N(R_3R_4R_5R_6)^+$, wherein $R_3$, $R_4$, $R_5$ and $R_6$, which may be identical or different, are each an alkyl radical having from 1 to 4 carbon atoms or a hydrogen atom, or a cation of a metal whose salts from benzenesulfonic acid are soluble in water; $m_1$, $m_2$ and $m_3$ are integers, which may be identical or different, ranging from 0 to 5; and $n_1$, $n_2$ and $n_3$ are integers, which may be identical or different, ranging from 0 to 3, with the proviso that one of $n_1$, $n_2$ and $n_3$ is at least equal to or greater than 1.

Exemplary metals whose salts of benzensulfonic acid are water soluble include lead, zinc and tin.

By the expression "water soluble" is intended a compound which is soluble in water to an extent of at least 0.01 g per liter.

Among the phosphines of formula (I), preferred are those in which $Ar_1$, $Ar_2$ and $Ar_3$ are phenyl radicals; $Y_1$, $Y_2$ and $Y_3$ are each alkyl radicals having from 1 to 2 carbon atoms, or alkoxy radicals having from 1 to 2 carbon atoms; M is a cation selected from among $H^+$, cations of Na, K, Ca, Ba, $NH_4^+$, tetramethylammonium, tetraethylammonium, tetrapropylammonium or tetrabutylammonium cations; $m_1$, $m_2$ and $m_3$ are integers ranging from 0 to 3; and $n_1$, $n_2$ and $n_3$ are integers ranging from 0 to 3, at least one of which is greater than 1.

Among these phosphines, the most particularly preferred are the sodium, potassium, calcium, barium, ammonium, tetramethylammonium and tetraethylammonium salts of mono(sulfophenyl)diphenylphosphine, di(sulfophenyl) phenylphosphine and tri(sulfophenyl)phosphine, wherein the $SO_3$ functional groups are preferably in the meta-position.

Other exemplary phosphines of formula (I) include alkali metal salts or alkaline earth metal salts, the ammonium salts, and the quaternary ammonium salts of (3-sulfo-4-methylphenyl) di(4-methylphenyl)phosphine; (3-sulfo-4-methoxyphenyl) di(4-methoxyphenyl)phosphine; (3-sulfo-4-chlorophenyl) di(4-chlorophenyl)phosphine; di(3-sulfophenyl)phenylphosphine; di(4-sulfophenyl) phenylphosphine; di(3-sulfo-4-methylphenyl)(4-methylphenyl)phosphine; di (3 -sulfo-4-methoxyphenyl)(4-methoxyphenyl)phosphine; di(3-sulfo-4-chlorophenyl)(4-chlorophenyl)phosphine; tri(3-sulfophenyl)phosphine; tri(4-sulfophenyl)phosphine; tri(3-sulfo-4-methylphenyl) phosphine; tri(3-sulfo-4-methoxyphenyl)phosphine; tri(3-sulfo-4-chlorophenyl)phosphine; (2-sulfo-4-methylphenyl) (3-sulfo-4-methylphenyl) (3,5-disulfo-4-methylphenyl) phosphine; (3-sulfophenyl)(3-sulfo-4-chlorophenyl)(3,5-disulfo-4-chlorophenyl)phosphine.

It will of course be appreciated that a mixture of these phosphines may be used, in particular a mixture of mono-, di- and tri-metasulfonated phosphines.

The preferred transition metal compounds include nickel, cobalt, iron, palladium, platinum, rhodium and iridium compounds. Water soluble compounds or compounds that pass into solution under the conditions of the reaction are used. The remaining ligands bonded to the metal are not critical, as long as they satisfy these conditions.

Among the immediately aforesaid compounds, the most preferred are those of nickel. Exemplary thereof are such compounds as nickel carboxylates (especially nickel acetate, formate and citrate), nickel carbonate, nickel bicarbonate, nickel borate, nickel bromide, nickel chloride, nickel iodide, nickel thiocyanate, nickel cyanide, nickel hydroxide, nickel hydrophosphite, nickel phosphite, nickel phosphate and derivatives thereof, nickel nitrate, nickel sulfate, nickel sulfite, nickel arysulfonates and nickel alkylsulfonates.

It is not necessary for the nickel compound itself to be water-soluble. For example, nickel cyanide, which is not very soluble in water, dissolves very well in an aqueous solution of sulfonated phosphine.

The electrolysis or electrolytic cell of the electrolyzer employed in the present process of the invention comprises a cathode compartment and an anode compartment which are separated by appropriate separator element.

The cathode of the electrolysis cell may be made of a material such as platinum, gold, iridium, ruthenium, palladium, nickel, graphite, vitreous carbon, iron, a stainless steel, a special steel, lead, mercury or an amalgam. It may also be made of titanium, of tantalum, of nickel or of a stainless steel, coated with a layer of platinum, of gold, of iridium, of ruthenium, of a mixture of a plurality of these metals, of platinum, palladium, iridium, rhodium, ruthenium, osmium or tantalum oxides, or of a mixture of more than one of these oxides.

The cathode may have a planar structure, such as a plate or grid, or a voluminal structure; it can in particular be perforated or comprise a variety of openings. As types of voluminal structures, granular stacks of the previously mentioned materials, or felts or foams thereof may be used.

The anode may be made of a material such as platinum, gold, iridium, ruthenium, palladium, nickel, graphite, vitreous carbon, a stainless steel, a special steel or lead. It may also be made of titanium or of tantalum coated with a layer of platinum, of gold, of iridium, of ruthenium, of a mixture of more than one of these metals, of platinum, palladium, iridium, rhodium, ruthenium, osmium or tantalum oxides, or of a mixture of more than one of these oxides.

The structure of the anode may be of different types from that defining the cathode.

The separator element of the electrolysis cell advantageously comprises an ion-exchange membrane or a porous diaphragm.

The membranes may be of the cationic type, especially those prepared from cation-exchange resins comprising acid groups such as sulfonic groups or carboxylic groups. Preferably, membranes prepared from sulfonic resins will be used. Exemplary such membranes include, for example, those marketed under the Nafion® (perfluorinated sulfonic membranes) or Selemion® trademarks.

The membranes may also be of the anionic type, but cationic membranes are generally preferred since they present a certain number of advantages. In particular, they are stronger than anionic membranes and they also permit stronger currents to be utilized.

The porous diaphragms are especially diaphragms made of porous ceramic, diaphragms made of woven or nonwoven synthetic fibers, or deposited diaphragms based on asbestos fibers or on synthetic fibers.

The separator element may be arranged such as to bear on the anode or on the cathode.

As indicated above, the aqueous solution containing the sulfonated phosphine and the transition metal compound is located in the cathode compartment. The initial concentration of sulfonated phosphine generally ranges from $10^{-3}$ mol/liter to 1 mol/liter. The initial concentration of transition metal compound, especially of nickel compound, generally ranges from $10^{-5}$ mol/liter to 1 mol/liter.

Other compounds that increase the conductivity of the electrolyte, such as soluble salts for example, may be added to the cathode compartment.

Complexing agents that modify the potential at which the reduction of the transition metal takes place may also be added. Exemplary such complexing agents are the cyanides.

The solution in the cathode compartment may furthermore include compounds that complement the catalyst prepared by the process of the invention. These compounds are, in particular, Lewis acids.

By "Lewis acids" is intended the usual definition, compounds which can accept electron pairs.

The Lewis acids described in G. A. Olah, *Friedel-Crafts and related reactions*, volume 1, pages 191 to 197 (1963), may thus be employed.

The Lewis acids which may be employed in the cathode compartment are advantageously selected from among elements in Groups Ib, IIb, IIIa, IIIb, IVa, IVb, Va, Vb, VIb, VIIb and VIII of the Periodic Table, insofar as said compounds are at least partially soluble and stable in water or, more generally, in the aqueous solution to be electrolytically treated. These compounds are typically salts, especially halides, preferably chlorides and bromides, sulfates, nitrates, sulfonates, especially trifluoromethanesulfonates, carboxylates, acetylacetonates, tetrafluoroborates and phosphates.

Exemplary such Lewis acids include zinc chloride, zinc bromide, zinc iodide, zinc trifluoromethanesulfonate, zinc acetate, zinc nitrate, zinc tetrafluoroborate, manganese chloride, manganese bromide, nickel chloride, nickel bromide, nickel cyanide, nickel acetylacetonate, cadmium chloride, cadmium bromide, stannous chloride, stannous bromide, stannous sulfate, stannous tartrate, chlorides, bromides, sulfates, nitrates, carboxylates or trifluoromethanesulfonates of the rare earth elements such as lanthanum, cerium, praseodymium, neodymium, samarium, europium, gadolinium, terbium, dysprosium, holmium, erbium, thulium, ytterbium and lutetium, cobalt chloride, ferrous chloride and yttrium chloride.

It too will be appreciated that more than one Lewis acid may be employed.

Among these Lewis acids, preferred are zinc chloride, zinc bromide, zinc sulfate, zinc tetrafluoroborate, stannous chloride, stannous bromide, zinc chloride/stannous chloride mixtures, nickel chloride, nickel bromide and nickel acetylacetonate.

The amount of Lewis acid employed generally ranges from 0 to 50 mol per mole of transition metal compound, more particularly of nickel compound, and preferably from 0 to 10 mol per mole.

The anode compartment contains an aqueous solution of an anolyte which may comprise an acid such as, especially, sulfuric acid, nitric acid, water-soluble carboxylic acids such as acetic acid, of their salts, especially sodium, potassium, ammonium or quaternary ammonium salts, or a base such as, especially, sodium hydroxide or potassium hydroxide. Preferably, the anolyte will be selected from among sulfuric acid and salts thereof, especially dipotassium sulfate, potassium hydrogen sulfate, disodium sulfate and sodium hydrogen sulfate.

The anolyte may also comprise one or more sulfonated phosphines as described above.

The initial concentration of the anolyte in the solution in the anode compartment generally ranges from $10^{-2}$ mol/liter to 3 mol/liter.

The electric current employed in the process of the invention is defined by its intensity and the cathode potential. The potential may be maintained constant throughout the electrolysis (potentiostatic process). Another option is to maintain the intensity constant (galvanostatic process). In continuous operation of the process of the invention, these two embodiments are equivalent.

When the process is carried out at constant potential, the value thereof may readily be determined by one skilled in this art from the plot of current/potential curves.

The current density may attain a value of 30 A/dm². It is adjusted depending on the amount of transition metal to be reduced.

The temperature at which the process is carried out generally ranges from 0° C. to 95° C.

One advantageous embodiment of the process of the invention comprises regenerating a spent catalyst, namely, a catalyst which has been used and has become at least partially inactivated. Thus, a catalyst based on a sulfonated phosphine and on a transition metal having an oxidation number of 0 to 1, optionally also containing one or more Lewis acids, which is used in the butadiene and/or pentenentrile hydrocyanation reaction, progressively becomes deactivated, in particular by oxidation of the transition metal. The latter, and more particularly nickel, is converted, at least partly, into a cyanide. At the end of the hydrocyanation reaction, the aqueous phase containing, especially, the sulfonated phosphine and the transition metal compound may be easily separated from the organic phase. This aqueous phase may contain relatively small amounts of compounds which are initially introduced, such as butadiene and/or pentenentriles, or are formed during the reaction, such as adiponitrile, methylglutaronitrile, ethylsuccinonitrile, pentenentriles and methylbutenenitriles. The aqueous phase is electrochemically treated, as described above, to regenerate the catalyst.

In order to further illustrate the present invention and the advantages thereof, the following specific examples are given, it being understood that same are intended only as illustrative and in nowise limitative.

EXAMPLES:

Apparatus used

The electrolysis cell comprised a cylindrical glass container having a working volume of approximately 100 ml, in which were arranged a cathode in the form of a platinum grid and a cylindrical anode well which was situated inside the cathode grid and which included, at its base, a membrane fabricated from resin of the Nafion 417® type and in which the anode, in the form of a platinum plate, was immersed.

The electrolyzer was connected to a potentiostat which enabled the cathode potential to be maintained at a value of −1.2 volts with respect to an Ag/AgCl reference electrode.

Abbreviations employed

TSTPP=sodium salt of trisulfonated triphenylphosphine
3PN=3-pentenenitrile
5 ADN=adiponitrile
2M3=2-methyl-3-butenenitrile
BD=butadiene
DC=degree of conversion
RT=selectivity of a compound obtained with respect to the converted initial compound
t.o.=turnover=number of mmol of nitriles or of dinitriles formed per mmol of Ni(0) involved
COD=cyclooctadiene EXAMPLES 1 to 5

Synthesis of an Ni(0)/TSTPP catalyst by electrochemical reduction of $Ni(CN)_2$ in an aqueous solution of TSTPP 50 ml of an aqueous solution of nickel cyanide ($Ni(CN)_2$:10.6 g/kg) and of TSTPP (300 g/kg of water) were introduced into the cathode compartment.

20 ml of anolyte (having the composition reported in Table 1 below) were introduced into the anode compartment. The electrolysis was carried out at 25° C. at the controlled potential of −1.2 volts. Samples were regularly removed to assay the remaining Ni(II) by polarography. The results obtained are reported in Table 1:

TABLE 1

| Examples | Anolyte | Duration (min) | DC $Ni(CN)_2$ (%) |
|---|---|---|---|
| 1 | 0.6M TSTPP | 220 | 50 |
| 2 | 1.5M $KHSO_4$ | 400 | 92 |
| 3 | saturated $K_2SO_4$ | 400 | 48 |
| 4 | saturated $K_2SO_4$ | 1350 | 75 |
| 5 | 0.1N $H_2SO_4$ | 75 | 77 |

3-Penenentrile hydrocyanation tests (a), (b), (c) and (d) on the solutions 1, 2, 4 and 5 of electrochemically generated catalysts were carried out.

The results obtained are reported in Table 2:

TABLE 2

| Tests | Catalyst | Ni (0) (mmol) | HCN (mmol/h) | $RT_{ADM}$ | t.o. |
|---|---|---|---|---|---|
| CT1* | Ni $(COD)_2$/TSTPP | 5 | 67.4 | 61 | 30 |
| CT2** | Ni $(CN)_2$ $(TSTPP)_2$ | 0 | 67.4 | 0 | 0 |
| (a) | Solution 1 | 3 | 55.7 | 64 | 38 |
| (b) | Solution 2 | 3.8 | 50.5 | 63 | 37 |
| (c) | Solution 4 | 3.2 | 54.7 | 63 | 35 |
| (d) | Solution 5 | 2.9 | 39.1 | 61 | 37 |

The operating conditions for the hydrocyanation tests were:

3PN: 320 mmol; $ZnCl_2$: 20 mmol; 65° C.; 3 h.

CT1*=comparative test using a catalyst prepared by exchange of the COD ligands of $Ni(COD)_2$ by TSTPP;

CT2**=comparative test using a solution of $Ni(CN)_2$ $(TSTPP)_2$ which was not electrochemically treated.

A butadiene hydrocyanation test (e) on the electrochemically generated catalyst Solution 1 was carried out.

The results obtained are reported in Table 3:

TABLE 3

| Tests | Catalyst | BD (mmol) | Ni (0) (mmol) | HCN (mmol/h) | $RT_{3PN+2M3}$ | t.o. |
|---|---|---|---|---|---|---|
| CT3* | Ni $(COD)_2$/TSTPP | 400 | 5.5 | 350 | 97 | 70 |
| CT4** | Ni $(CN)_2$ $(TSTPP)_2$ | 400 | 0 | 350 | 0 | 0 |
| (e) | Solution 1 | 530 | 4 | 386 | 90 | 60 |

The operating conditions for the hydrocyanation tests were:

TSTPP: 25 mmol; 90° C.; 1.2 h.

CT3*=comparative test using a catalyst prepared by exchange of the COD ligands of Ni(COD)$_2$ by TSTPP;

CT4**=comparative test using a solution of Ni(CN)$_2$ (TSTPP)$_2$ which was not electrochemically treated.

EXAMPLE 6

Synthesis of Ni(0)/TSTPP catalyst by reduction Ni (CN)$_2$ in an aqueous solution of TSTPP 50 ml of an aqueous solution of nickel chloride (NiCl$_2$:17.4 g/kg), TSTPP (300 g/kg of water) and sodium cyanide (NaCN: 6.6 g/kg) were introduced into the cathode compartment.

20 ml of a saturated aqueous solution of K$_2$SO$_4$ were introduced into the cathode compartment. The electrolysis was carried out at 25° C. at a controlled potential of −1.2 volts. Samples were regularly removed to assay the remaining Ni(II) by polarography.

The results obtained are reported in Table 4:

TABLE 4

| Example | Anolyte | Duration (min) | DC Ni (II) (%) |
|---|---|---|---|
| 6 | Saturated K$_2$SO$_4$ | 1000 | 80 |

3PN hydrocyanation test (f) on Solution 6 of the electrochemically regenerated catalyst was carried out.

The results obtained are reported in the following Table 5:

TABLE 5

| Test | Cacalyst | Ni (O) (mmol) | HCN (mmol/h) | RT$_{ADN}$ | t.o. |
|---|---|---|---|---|---|
| (f) | Solution 6 | 4.45 | 57.5 | 59 | 25 |

EXAMPLE 7

Regeneration of an aqueous solution of Ni/TSTPP emanating from the hydrocyanation of 3-pentenenitrile (a) Introduced into a 150 ml glass reactor, stirred by means of a turbine, were:

(i) 38 ml of an aqueous solution containing 5 mmol of nickel (0), 20 mmol of TSTPP and 20 ml of zinc chloride;

(ii) 32.4 ml of 3PN (320 mmol).

The entire system was heated to 65° C. and pure hydrocyanic acid (condensed at −10° C.) was injected therein at a flow rate of 67 mmol/h for 3.5 h. After cooling, degassing and settling, the two phases were separated. The organic phase was assayed by gas phase chromatography (GPC):

(a') 3-pentenenitrile: 177 mmol, (b') ethylsuccinonitrile: 13 mmol, (c') methylglutaronitrile: 35 mmol, (d') adiponitrile: 92 mmol, 28 mmol of dinitriles being formed per mmol of nickel.

(b) The completely inactive aqueous phase was electrolyzed at a potential of −1.2 volts with respect to an Ag/AgCl reference electrode for 3 h.

(c) Replaced in the reactor were:

(i) 29 ml of the aqueous catalyst solution thus regenerated;

(ii) 10 mmol of ZnCl$_2$;

(iii) 32.4 ml of 3PN (320 mmol).

The entire system was heated to 65° C. and hydrocyanic acid was injected therein at a flow rate of 34 mmol/h for 6 h. After cooling and degassing, the various nitriles were assayed by GPC:

(a') 3-nitrilepentene: 183 mmol, (b') ethylsuccinonitrile: 14 mmol, (c') methylglutaronitrile: 39 mmol, (d') adiponitrile: 78 mmol, 32 mmol of dinitriles being formed per mmol of nickel.

These results indicate that the catalyst was completely regenerated.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the electrochemical synthesis of a compound comprising at least one transition metal having an oxidation number of 0 or 1 and at least one sulfonated phosphine, which comprises electrolyzing an aqueous solution catholyte containing at least one transition metal compound and at least one sulfonated phosphine, wherein said compound comprising at least one transition metal having an oxidation number of 0 or 1 and said at least one sulfonated phosphine is synthesized.

2. The process as defined by claim 1, carried out in an electrolytic cell comprising a cathode compartment and an anode compartment, said cathode compartment and said anode compartment being separated by a separator element which comprises an ion-exchange membrane or a porous diaphragm.

3. The process as defined by claim 2, a cathode of said electrolytic cell comprising platinum, gold, iridium, ruthenium, palladium, nickel, graphite, vitreous carbon, iron, a stainless steel, a non-stainless steel, lead, mercury or an amalgam, or comprising titanium, tantalum, nickel or a stainless steel, coated with a layer of platinum, of gold, of iridium, of ruthenium, or of a mixture thereof, of platinum, palladium, iridium, rhodium, ruthenium, osmium or tantalum oxides, or of a mixture thereof.

4. The process as defined by claim 2, a cathode and an anode of said electrolytic cell having a planar or a voluminal structure comprising perforations or openings.

5. The process as defined by claim 2, a cathode or an anode of said electrolytic cell having a voluminal structure comprising a granular stack of material, or felt or foam thereof.

6. The process as defined by claim 2, the anode of said electrolytic cell comprising platinum, gold, iridium, ruthenium, palladium, nickel, graphite, vitreous carbon, a stainless steel, a non-stainless steel, lead, or comprising titanium or tantalum coated with a layer of platinum, of gold, of iridium, of ruthenium, or of a mixture thereof, of platinum, palladium, iridium, rhodium, ruthenium, osmium or tantalum oxides, or of a mixture thereof.

7. The process as defined by claim 2, said separator element comprising a cationic membrane shaped from a cation-exchange resin containing acid functional groups.

8. The process as defined by claim 2, said separator element comprising a porous ceramic diaphragm, a woven or nonwoven synthetic fiber diaphragm, or a deposited diaphragm based on asbestos fibers or on synthetic fibers.

9. The process as defined by claim 2, said anode compartment containing an aqueous solution of an anolyte which comprises an acid or salt thereof, or a base.

10. The process as defined by claim 9, the initial concentration of the anolyte in the solution in the anode compartment ranging from $10^{-2}$ mol/liter to 3 mol/liter.

11. The process as defined by claim 2, said anode compartment containing an aqueous solution of an anolyte which comprises at least one sulfonated phosphine.

12. The process as defined by claim 1, said at least one sulfonated phosphine having the structural formula (I):

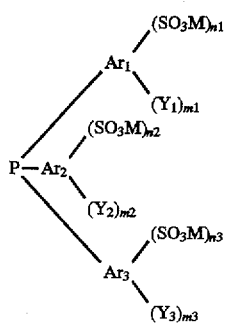

in which $Ar_1$, $Ar_2$ and $Ar_3$, which may be identical or different, are each an aryl radical; $Y^1$, $Y^2$ and $Y^3$, which may be identical or different, are each an alkyl radical having from 1 to 4 carbon atoms, an alkoxy radical having from 1 to 4 carbon atoms, a halogen atom, a CN radical, an $NO_2$ radical, an OH radical, an $NR_1R_2$ radical, wherein $R_1$ and $R_2$, which may be identical or different, are each an alkyl radical having from 1 to 4 carbon atoms; M is an inorganic or organic cation selected such that the compound of formula (I) is soluble in water, from among $H^+$, an alkali metal or alkaline earth metal cation, a cation having the formula $N(R_3R_4R_5R_6)^+$, wherein $R_3$, $R^4$, $R_5$ and $R_6$, which may be identical or different, are each an alkyl radical having from 1 to 4 carbon atoms or a hydrogen atom, or a cation of a metal whose salts from benzenesulfonic acid are soluble in water; $m_1$, $m_2$ and $m_3$ are integers, which may be identical or different, ranging from 0 to 5; and $n_1$, $n_2$ and $n_3$ are integers, which may be identical or different, ranging from 0 to 3, with the proviso that one of $n_1$, $n_2$ and $n_3$ is at least equal to or greater than 1.

13. The process as defined by claim 12, wherein formula (I), $Ar_1$, $Ar_2$ and $Ar_3$ are phenyl radicals; $Y_1$, $Y_2$ and $Y_3$ are each alkyl radicals having from 1 to 2 carbon atoms, or alkoxy radicals having from 1 to 2 carbon atoms; M is a cation selected from among $H^+$, cations of Na, K, Ca, Ba, $NH_4^+$, tetramethylammonium, tetraethylammonium, tetrapropylammonium or tetrabutylammonium cations; $m^1$, $m_2$ and $m_3$ are integers ranging from 0 to 3; and $n_1$, $n_2$ and $n_3$ are integers ranging from 0 to 3, at least one of which is greater than 1.

14. The process as defined by claim 12, said at least one sulfonated phosphine comprising a sodium, potassium, calcium, barium, ammonium, tetramethylammonium or tetraethylammonium salt of mono(sulfophenyl) diphenylphosphine, di(sulfophenyl)phenylphosphine or tri(sulfophenyl)phosphine.

15. The process as defined by claim 1, said at least one transition metal compound comprising a compound of nickel, cobalt, iron, palladium, platinum, rhodium or iridium that is soluble in water or which dissolves therein under the conditions of electrolysis.

16. The process as defined by claim 15, said at least one transition metal compound comprising a nickel carboxylate, nickel carbonate, nickel bicarbonate, nickel borate, nickel bromide, nickel chloride, nickel iodide, nickel thiocyanate, nickel cyanide, nickel hydroxide, nickel hydrophosphate, nickel phosphite, nickel phosphate or derivative thereof, nickel nitrate, nickel sulphate, nickel sulfite, a nickel arylsulfonate or a nickel alkylsulfonate.

17. The process as defined by claim 1, the initial concentration of sulfonated phosphine in said catholyte ranging from $10^{-3}$ mol/liter to 1 mol/liter and the initial concentration of said at least one transition metal compound therein ranging from $10^{-5}$ mol/liter to 1 mol/liter.

18. The process as defined by claim 1, said catholyte further comprising a compound that increases the conductivity of the electrolyte, a complexing agent that modifies the potential at which the reduction of said at least one transition metal occurs, or a combination thereof.

19. The process as defined by claim 18, said catholyte further comprising a Lewis acid selected from among compounds of the elements of Groups Ib, IIb, IIIa, IIIb, IVa, IVb, Va, Vb, VIb, VIIb and VIII of the Periodic Table.

20. The process as defined by claim 19, said Lewis acid comprising zinc chloride, zinc bromide, zinc iodide, zinc trifluoromethanesulfonate, zinc acetate, zinc nitrate, zinc tetrafluoroborate, manganese chloride, manganese bromide, nickel chloride, nickel bromide, nickel cyanide, nickel acetylacetonate, cadmium chloride, cadmium bromide, stannous chloride, stannous bromide, stannous sulfate, stannous tartrate, a chlorobromide, sulfate, nitrate, carboxylate or trifluoromethanesulfonate of lanthanum, cerium, praseodymium, neodymium, samarium, europium, gadolinium, terbium, dysprosium, holmium, erbium, thulium, ytterbium or lutetium, cobalt chloride, ferrous chloride or yttrium chloride.

21. The process as defined by claim 19, said Lewis acid comprising zinc chloride, zinc bromide, zinc sulfate, zinc tetrafluoroborate, stannous chloride, stannous bromide, a zinc chloride/stannous chloride mixture, nickel chloride, nickel bromide or nickel acetylacetonate.

22. The process as defined by claim 19, the Lewis acid being present in an amount not more than 50 mole per mole of transition metal compound.

23. The process as defined by claim 1, said aqueous solution catholyte comprising an at least partially spent catalyst based on at least one sulfonated phosphine and at least one transition metal.

24. The process as defined by claim 1, wherein the transition metal is nickel.

* * * * *